US008261937B2

(12) United States Patent
Bodziak et al.

(10) Patent No.: US 8,261,937 B2
(45) Date of Patent: Sep. 11, 2012

(54) ATTACHMENT SYSTEM AND DISPENSERS USED THEREWITH

(75) Inventors: Douglas P. Bodziak, Lake Elmo, MN (US); James E. Nash, Bloomington, MN (US); Peter Newbould, Milan (IT); Timothy J. O'Leary, White Bear Lake, MN (US); David C. Windorski, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 138 days.

(21) Appl. No.: 11/775,276

(22) Filed: Jul. 10, 2007

(65) Prior Publication Data

US 2008/0011626 A1 Jan. 17, 2008

Related U.S. Application Data

(60) Provisional application No. 60/864,169, filed on Nov. 3, 2006, provisional application No. 60/851,622, filed on Oct. 13, 2006, provisional application No. 60/830,764, filed on Jul. 14, 2006, provisional application No. 60/830,979, filed on Jul. 14, 2006.

(51) Int. Cl.
*A47K 10/24* (2006.01)
*B65H 1/00* (2006.01)
*B32B 9/00* (2006.01)
*B32B 33/00* (2006.01)

(52) U.S. Cl. .............. 221/45; 221/185; 221/47; 221/33; 221/282; 221/283; 221/48; 221/56; 428/900; 428/40.1; 428/41.9; 428/99; 428/100; 248/206.5; 248/205.3; 248/205.9; 206/39.3

(58) Field of Classification Search .................... 221/45, 221/185, 47, 33, 282, 283, 48, 56; 428/40.1, 428/41.9, 100, 900; 248/206.5, 205.3, 205.9; 206/39.3
See application file for complete search history.

(56) References Cited

U.S. PATENT DOCUMENTS

| D120,743 S | 5/1940 | Petzold |
| 3,068,055 A * | 12/1962 | Lenzi et al. ..................... 312/50 |
| 3,381,853 A | 5/1968 | Ferris et al. |

(Continued)

FOREIGN PATENT DOCUMENTS

WO   WO 96/33073   10/1996

(Continued)

OTHER PUBLICATIONS

U.S. Appl. No. 29/263,060, James E. Nash, et al., filed Jul. 14, 2006.

(Continued)

*Primary Examiner* — Gene O. Crawford
*Assistant Examiner* — Rakesh Kumar
(74) *Attorney, Agent, or Firm* — Yen Tong Florczak

(57) ABSTRACT

A dispenser includes an upper member having a slot and a lower member attached to the upper member thereby forming a housing, the lower member having an outer surface; a stack of sheets assembled in a fan-fold configuration disposed in the housing; and a polymeric holding film having a first surface attached to the outer surface of the lower member. The holding film having a flexural modulus less than about 50 MPa, as measured according to ASTMD790 standard, and a roughness parameter, $R_a$ of less than about 1 micrometer, as calculated according to ASME B46.1 standard.

18 Claims, 8 Drawing Sheets

U.S. PATENT DOCUMENTS

| | | | |
|---|---|---|---|
| 4,003,538 A * | 1/1977 | Frye | 248/544 |
| 4,390,576 A * | 6/1983 | Hutter, III | 428/40.1 |
| 4,778,702 A * | 10/1988 | Hutter, III | 428/40.9 |
| 4,828,303 A | 5/1989 | Soria | |
| 4,907,825 A * | 3/1990 | Miles et al. | 281/51 |
| 5,014,946 A * | 5/1991 | Gruber | 248/206.5 |
| 5,180,132 A | 1/1993 | Pearson et al. | |
| 5,358,141 A * | 10/1994 | Carlson et al. | 221/185 |
| 5,397,117 A | 3/1995 | Mertens | |
| 5,401,547 A * | 3/1995 | Blackwell et al. | 428/41.8 |
| 5,411,168 A | 5/1995 | Mertens et al. | |
| D396,247 S | 7/1998 | Carlson et al. | |
| D396,492 S | 7/1998 | Carlson et al. | |
| 5,964,375 A * | 10/1999 | Carlson et al. | 221/45 |
| 6,053,356 A * | 4/2000 | Emoff et al. | 221/45 |
| 6,136,392 A | 10/2000 | Sheffield, Jr. et al. | |
| D434,801 S | 12/2000 | Van Den Berg | |
| 6,364,099 B2 * | 4/2002 | Emoff et al. | 206/39.3 |
| D502,740 S | 3/2005 | Stoddard et al. | |
| 6,972,141 B1 * | 12/2005 | Bries et al. | 428/40.1 |
| 7,121,924 B2 * | 10/2006 | Fritz et al. | 451/28 |
| 7,186,908 B2 * | 3/2007 | Hodesh et al. | 84/320 |
| 2005/0109790 A1 * | 5/2005 | Hsu | 221/34 |

FOREIGN PATENT DOCUMENTS

| | | |
|---|---|---|
| WO | WO 97/19272 | 5/1997 |
| WO | WO 99/42299 | 8/1999 |

OTHER PUBLICATIONS

U.S. Appl. No. 29/263,059, James E. Nash, et al., filed Jul. 14, 2006.
ASTM Designation D790-07, Standard Test Methods for Flexural Properties of Unreinforced and Reinforced Plastics and Electrical Insulating Materials.
ASME B46.1-2002, (Revision of ASME B46.1-1995), Surface Texture (Surface Roughness, Waviness, and Lay), An American National Standard, The American Society of Mechanical Engineers, pp. 1-98.

* cited by examiner

ATTACHMENT SYSTEM AND DISPENSERS USED THEREWITH

CROSS-REFERENCE TO RELATED APPLICATION

The present invention is claims priority to U.S. Provisional Patent Applications Ser. Nos. 60/830,764 and 60/830,979, both filed on Jul. 14, 2006, Application 60/851,622 filed Oct. 13, 2006, and Application 60/864,169 filed Nov. 3, 2006, each of which is incorporated by reference in its entirety.

FIELD OF THE INVENTION

The present invention pertains to an attachment system and to dispensers used in conjunction with the attachment system. The attachment system, when attached to a dispenser, allows for one-handed removal of a sheet disposed in the dispenser.

BACKGROUND

There are many devices that can provide suction between an article and a surface. For example, suction cups can be used on a surface, such as windows and doors, for displaying decorations or to hold an item in a desired place. Typical suction cups have a circular rim and a concave surface that is intended to be in contact with a display surface once the suction cup is mounted. In many cases, the suction cup holds an item in place, whether on a vertical or horizontal surface. To remove the suction cup from the surface, a user typically breaks the suction between the suction cup and the surface, by, e.g., wedging a device between the two. Other devices used for attaching an item to a surface include adhesive and ferro-magnetic materials. However, these materials have limitations regarding relative movement of the device and the types of surfaces that can be used. For example, use of ferro-magnetic materials as the attachment device would necessarily limit a display surface to a metal-based material.

U.S. Pat. No. 5,014,946 (Gruber) discloses a holding, retaining, and adhering means comprising a holding member characterized by a flexible plate connected to a bottom surface of a comparatively rigid holding member at a fastening point located at an inner surface of the flexible plate. The flexible plate is adapted to an unevenness of a surface upon which it is placed such that when a tilting or tipping force is applied, a drawing-off force is likewise applied to the rigid holding member.

There is a need for other attachment systems that are easy to use and capable of being used on a variety of surfaces spanning from wood, to metals, to plastic surfaces.

SUMMARY

The attachment system and dispensers of the present invention exhibit temporary attachment between a work surface, such as a table top. While the present description focuses primarily on a dispenser used with the attachment system, non-dispenser items can be used as well.

In one aspect, the present invention pertains to an attachment system comprising (a) a polymeric holding film having a first major surface and a flexural modulus of less than about 50 MPa, as measured according to ASTM D790 standard, and a roughness parameter, $R_a$, of less than about 1 micrometer, as calculated according to ASME B46.1 standard, and (b) an attachment mechanism disposed on the first major surface of the holding film. The holding film has a first surface area. The attachment mechanism has a second surface area. The ratio of the first to second surface area is from about 10:1 to 3:1. In one embodiment, the holding film is circular in geometry while the attachment mechanism is either square or circular.

In another aspect, the present invention pertains to a dispenser comprising (a) an upper member having a slot and a lower member attached to the upper member thereby forming a housing, the lower member having an outer surface; (b) a stack of sheets assembled in a fan-fold configuration disposed in the housing; and (c) a polymeric holding film having a first surface attached to the outer surface of the lower member, the holding film having a flexural modulus less than about 50 MPa, as measured according to ASTM D790 standard, and a roughness parameter, $R_a$, of less than about 1 micrometer, as calculated according to ASME B46.1 standard.

The attachment system, includes a holding film having physical properties, as defined by flexural modulus, and surface roughness, that allow the system to create a vacuum and cling to a wide variety of surfaces, from smooth surfaces such as metal based tables, to rougher surfaces such as wood based table tops. When a dispenser is used in combination with the attachment system such that the holding film is in direct contact with a work surface, the dispenser is able to slide across the work surface. It is believed that the sliding motion may increase the vacuum. The vacuum keeps the dispenser in place when a sheet material is removed therefrom.

In this document, the term "about" is presumed to modify all numerical values.

BRIEF DESCRIPTION OF THE DRAWINGS

The invention can be better explained with reference to the figures, wherein.

Figure 1:
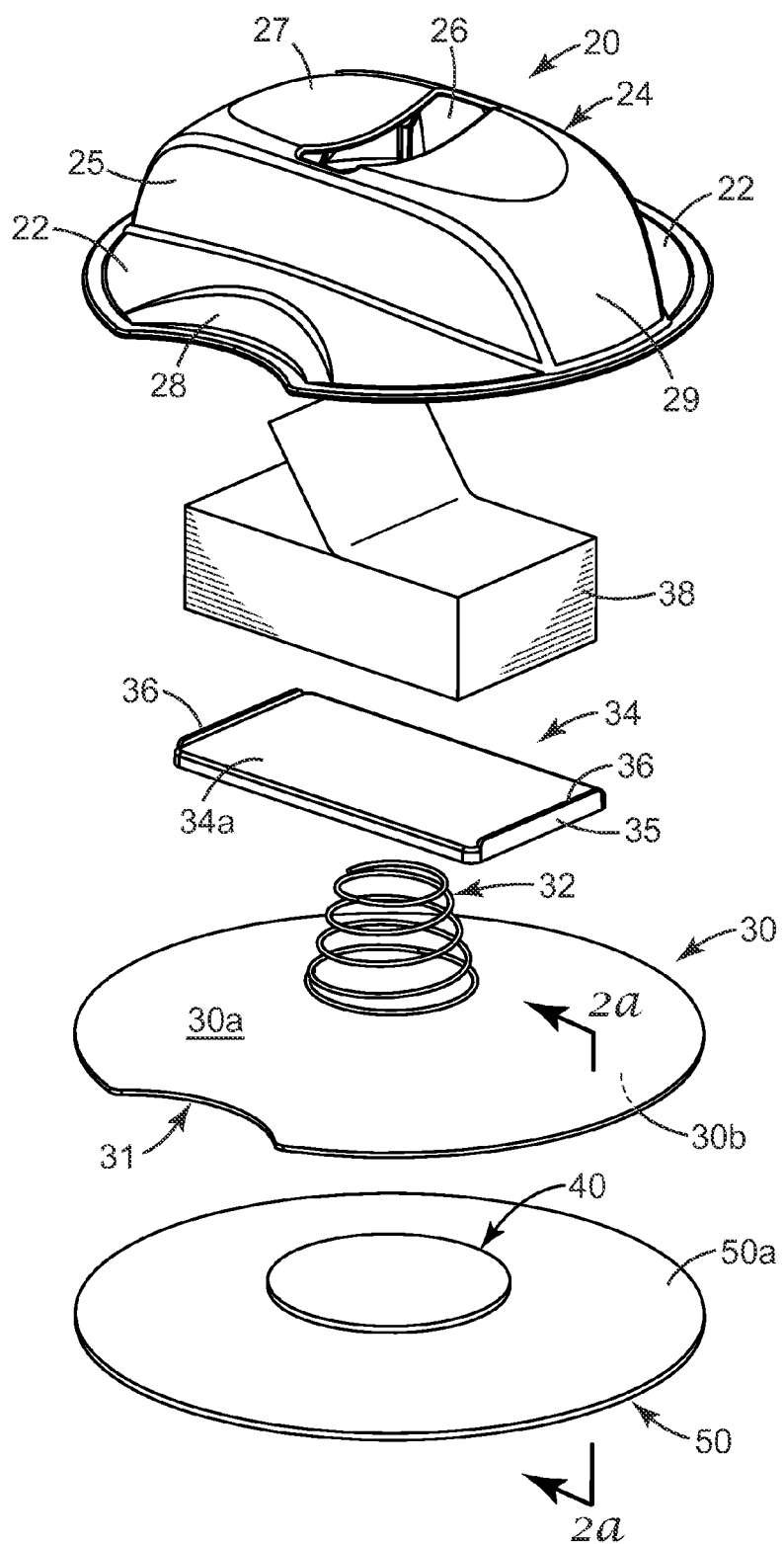
FIG. 1 is an exploded view of an exemplary dispenser.

These figures are idealized, are not drawn to scale, and are intended for illustrative purposes only.

DETAILED DESCRIPTION

One aspect of the present invention involves an attachment system that includes a polymeric holding film and an attachment mechanism. Unlike the traditional suction cup that holds an item in one place until the suction is broken, the attachment system allows an item, such as a dispenser, to remain stationary during dispensing while also allowing it to slide when pushed across a work surface. In addition to dispensers, the attachment system can be used with other items, such as, e.g., liquid containing receptacles such as cans, bottles, jars and the like, tissue boxes, and pads of papers.

The holding film has a flexural modulus less than 50 mega pascals (MPa), preferably less than 25 MPa, more preferably less than 10 MPa, and most preferably in the range of 5 to 7 MPa, as tested according ASTM D790 Standard Test Methods for Flexural Properties of Unreinforced and Reinforced Plastics and Electrical Insulating Materials. In brief summary, this test method involves a three-point bend test where the test conditions includes a span of 16 mm and a cross-head speed of 5 mm per minute and where the sample had a width of 25.4 mm and a length of 50 mm.

The holding film has an average roughness parameter ($R_a$) of less than 1 micrometer, calculated over the entire sample testing area. The roughness measurement is calculated according to ASME B46. 1 standard. In brief summary, in conducting this test, a sample of the holding film was first coated with a gold/palladium film (using a current of 40 mA and 10 second) and the film's surface topography or roughness was measured using a Wyko NT3300 optical interferometer operated in VSI mode with a 10× objection and a 2% modulation threshold. A useful polymeric holding film has a Shore A durometer of less than 70. The film has a thickness of 0.01 to 0.1 inch (0.25 to 2.5mm). The preferred ranges of flexural modulus, roughness, Shore A durometer, and thickness are characteristics of the polymeric film that tends to exhibit better drape of the film once attached to the dispenser. Preferably, the holding film has minimal amount of plasticizers, which could, over time, alter the film's effectiveness to create and maintain a vacuum. Also, the film should be sufficiently chemically inert over time so as not to stain the work surface upon which it is placed or to affect the attachment mechanism used to attach the film to the article.

Suitable polymeric films include polyurethane and rubbers made with ethylene propylene diene monomers (EPDM). Commercially available EPDM films include those available from McMaster-Carr, Atlanta, Ga. under product numbers 8610 K81 and 8143 K11.

The attachment mechanism can be mechanical based or adhesive based. Selection of the appropriate attachment mechanism depends on the user's preference as well as the article used. The attachment mechanism is typically located centrally on the holding film. If desired, the attachment mechanism can be disposed at multiple sites of the holding film. A suitable mechanical based attachment systems include recloseable fasteners, such as those described in U.S. Pat. No. 6,972,141 (Bries et al.).

A suitable adhesive based attachment mechanism is a stretch release adhesive strip with a rounded non-adhesive end tab available from 3M Company under the Command™ brand. The adhesive strip includes a double-sided adhesive portion where one side adheres to the exterior surface of the lower member while the other side adheres to the first surface of the holding film. By pulling on the non-adhesive end tab, the consumer disengages the stretch release adhesive from both surfaces. In this way, the holding film can be reused on a new dispenser, if desired. Yet another suitable adhesive based attachment mechanism is double sided tape, such as those commercially available from 3M Company under product number 4462W and 4466W. Yet another suitable adhesive based attachment mechanism involves the use of a cyanoacrylate adhesive, which is typically supplied in liquid form. The liquid adhesive can be dispensed on the holding film and applied to the exterior surface of the lower member where it will cure thereby bonding the two layers together. 3M™ Scotch-Weld™ Instant Adhesive, product designation CA40H, is a suitable cyanoacrylate adhesive that can be used in the present invention. This particular adhesive cures at room temperature (about 23° C.).

The design and size of the attachment mechanism relative to the holding film can affect the vacuum between the film and the work surface when a substantially normal force is imposed on the article to which the attachment system is attached. For one embodiment of the present invention, holding films having circular geometries and attachment mechanism having either circular or square geometry are suitable. Other geometries for holding films and attachment mechanisms can also be used in the present invention. In one embodiment, the ratio of the surface area of the holding film to the surface area of the attachment mechanism is from 10:1 to 3:1. The attachment mechanism is typically positioned nearly at the center of the holding film. After the holding film has been attached to the dispenser, a side view of the dispenser would show that the holding film crowns slightly toward the attachment site.

Now turning to the figures, FIG. 1 shows an exploded view of an exemplary dispenser of the present invention, which is particularly useful for dispensing a large number (greater than about 50 to 100) of sheets arranged in fan-fold (often referred to as "z" fold) stack 38. Such a sheet is disclosed in U.S. Pat. No. 4,907,825 (Miles et. al). The dispenser includes a cover (also referred to as an "upper member") 20 having substantially a circular rim. The upper member has two side portions 22 extending from opposing halves of the circular rim and protrusion 24 disposed between the two side portions. The protrusion is formed by two sidewalls 25 that extend from the side portions. The protrusion also has two sloping walls 29 that end at opposing regions of the rim. At a top of the protrusion, there is an opening (commonly referred to as a "slot") 26 that is appropriately sized to allow for removal of a sheet in the stack. Optionally, the upper member further includes a depression 27 and a cut-out section 28 on one side portion.

The dispenser of FIG. 1 further includes base (also referred to as a "lower member") 30 having a geometry that is substantially similar to that of the rim of cover 20. A housing is formed when the upper member is assembled to the lower member. The lower member also has cutout 31 that is substantially similar to and coinciding with cutout 28 of the upper member. When the upper and lower members are assembled, the two cutouts are generally aligned. The lower member has opposing interior surface 30a and exterior surface (not shown). Optional biasing mechanism, in this case a spring 32, rests on the interior surface of the lower member. Optional plate 34 provides a platform for stack of sheets 38, which rests on a first surface 34a of the plate. The second surface of the plate contacts the spring. The plate further includes optional ribs 36 at its opposing ends 35. The ribs provide a stop for the stack as it shuttles from one end to the other when an individual sheet is removed. U.S. Pat. No. 4,907,825 discloses the shuttling concept in detail. In one embodiment, the upper member is made of a transparent polymeric material and the lower member is made from cardstock that has a coating of heat activated adhesive on its rim, and the two parts are assembled together using heat sealing. Clear upper members can be used as they allow the users to see inside the housing.

A holding film 50 is attached to the exterior surface of the lower member 30 via an attachment mechanism 40 with first surface 50a of holding film 50 facing exterior surface 30b of lower member 30. FIG. 2a is a cross sectional view of lower member 30, attachment mechanism 40, and holding film 50. As stated previously, the combination of the holding film and the attachment mechanism make up the attachment system. In this particular embodiment, the holding film is substantially circular and is generally of the same dimensions as the lower member, except that the holding film does not include a cut out section. In one embodiment, the dispenser has a holding film diameter of 3 inches (7.62 cm) and the attachment mechanism is a one-inch (2.54 cm) square or one-inch circle attached centrally to the holding film.

Figure 2:
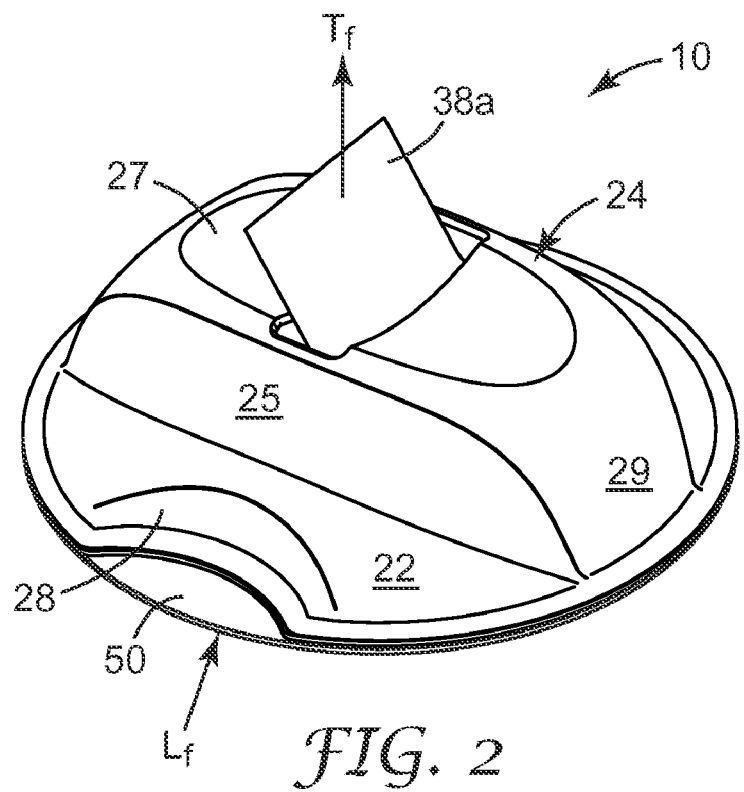
FIG. 2 is an isometric view of the dispenser of FIG. 1 in an assembled form.
Figure 2A:
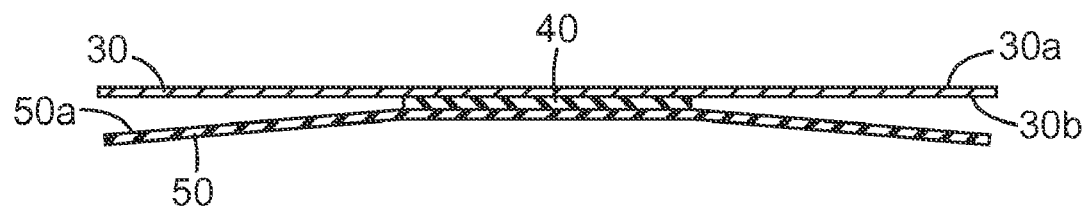
FIG. 2a is a cross-sectional view of the holding film and lower member of the dispenser of FIG. 1.

FIG. 2 shows an isometric view of dispenser 10 of FIG. 1 assembled such that sheet 38a extends through the slot and is ready for dispensing. As can be seen, because of the cut-outs in the upper and lower members, a portion of holding film 50 is exposed. When the user wants to break the vacuum between the holding film and a work surface, the user lifts the exposed portion of the holding film. In a dispensing mode, the user exerts a force on the dispenser by pulling on the sheet in the direction indicated generally by reference arrow, $T_f$. The vacuum between the holding film and the work surface keeps the dispenser stationary allowing the user to remove the sheet with one hand. In other words, the user does not need to hold down the dispenser with his or her free hand while removing the sheet from the dispenser. In either a dispensing or in a non-dispensing mode, the user can slide dispenser across a work surface. It is believed that this type of movement allows air that may be trapped between the holding film and the work surface to escape thereby increasing the vacuum. The dispenser can be used on horizontal and vertical work surfaces.

Figure 3:
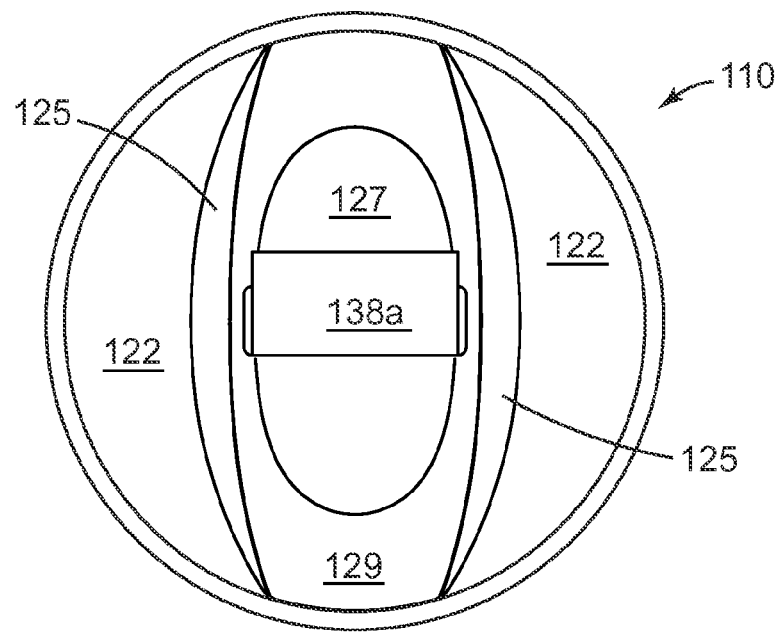
FIG. 3 is a top plan view of another exemplary dispenser.

FIG. 3 is a top plan view of another dispenser 110 similar to the dispesner of FIG. 1, except that there are no cutouts in the upper or lower members. The upper member has two side portions 122 extending from opposing halves of the circular rim and a protrusion disposed therebetween. The protrusion includes two side walls 125 that extend from the side portion two sloping walls 129 that meet at the rim. In this case, a user can also break the suction of the holding film on the work surface by e.g., sliding the dispenser to an edge of the work surface to break the vacuum.

Figure 4:
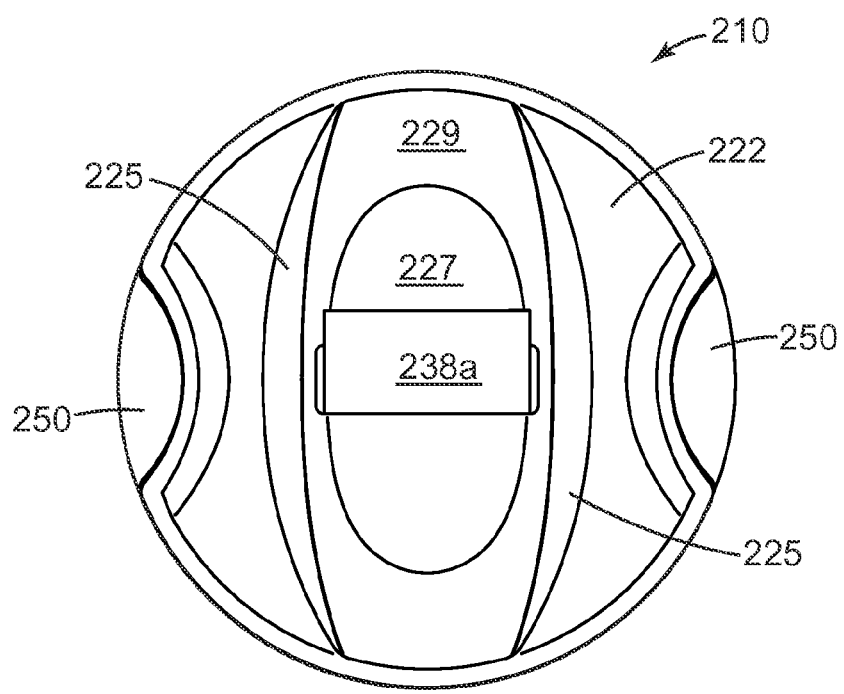
FIG. 4 is a top plan view of another exemplary dispenser.

FIG. 4 is a top plan view of yet another dispenser 210 similar to the dispenser of FIG. 1, except that there are two cut outs, one on each side of side portions 222. A protrusion with two side walls 225 is disposed between the side portions. This particular design allows the user to break the suction on either side of the dispenser.

The stacks shown in FIGS. 1 to 4 contain a plurality of elongated sheets releasably adhered to one another in a fan-fold configuration. Each sheet has a tab end portion, an adhesive end portion, and opposing first and second surfaces. The first surface is adhesive free and preferably writeable. The second surface includes a repositionable adhesive on its adhesive end portion, which is larger than the tab end portion and also transparent. If desired, the tab end portion may contain indicia and or may be brightly colored. If a sheet has a length L, the tab end portion is about 30 to 35% of the length while the adhesive end portion is about 65 to 70% of the sheet's length. The sheets are stacked such that for any two adjacent sheets, the tab end portion of one sheet lies at an opposing end of the stack relative to the next sheet.

Figure 5:
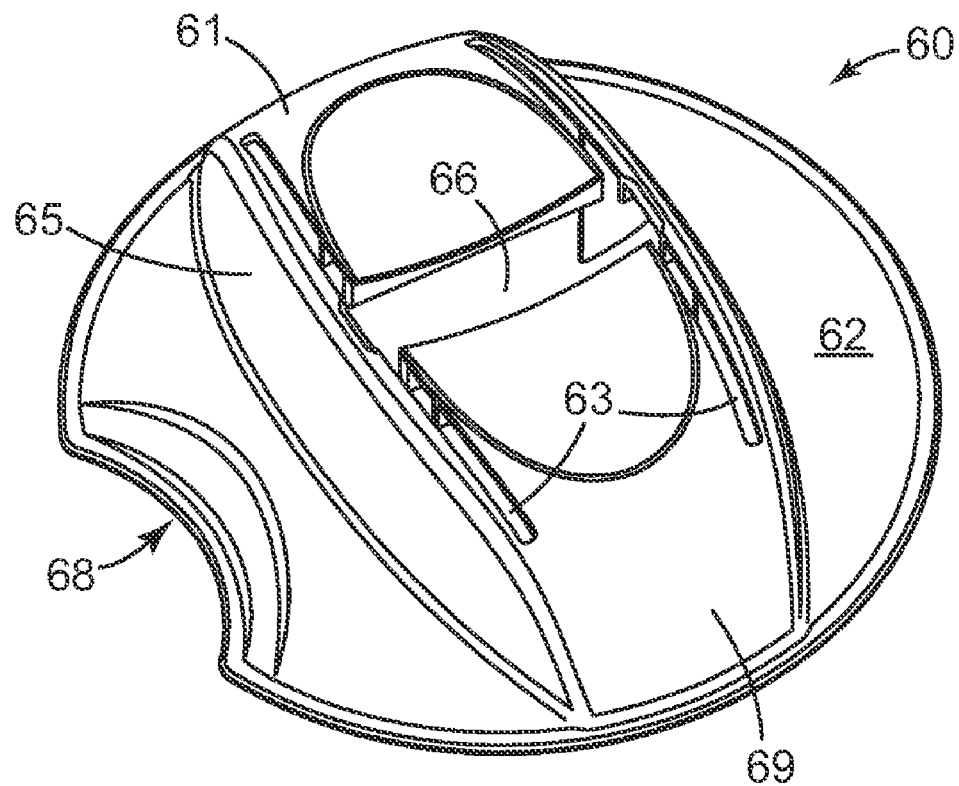
FIG. 5 is an isometric view of another exemplary upper member that can be used with the dispenser.

FIG. 5 shows an isometric view of another embodiment of another upper member 60 that can be used in the present invention. The upper member 60 is similar to the upper member 20 of FIG. 1, except that in top region 61 where slot 66 is disposed, two grooves 63 extend from each end of the slot. The grooves lie generally transverse to the slot along the length of the protrusion.

Figure 6:
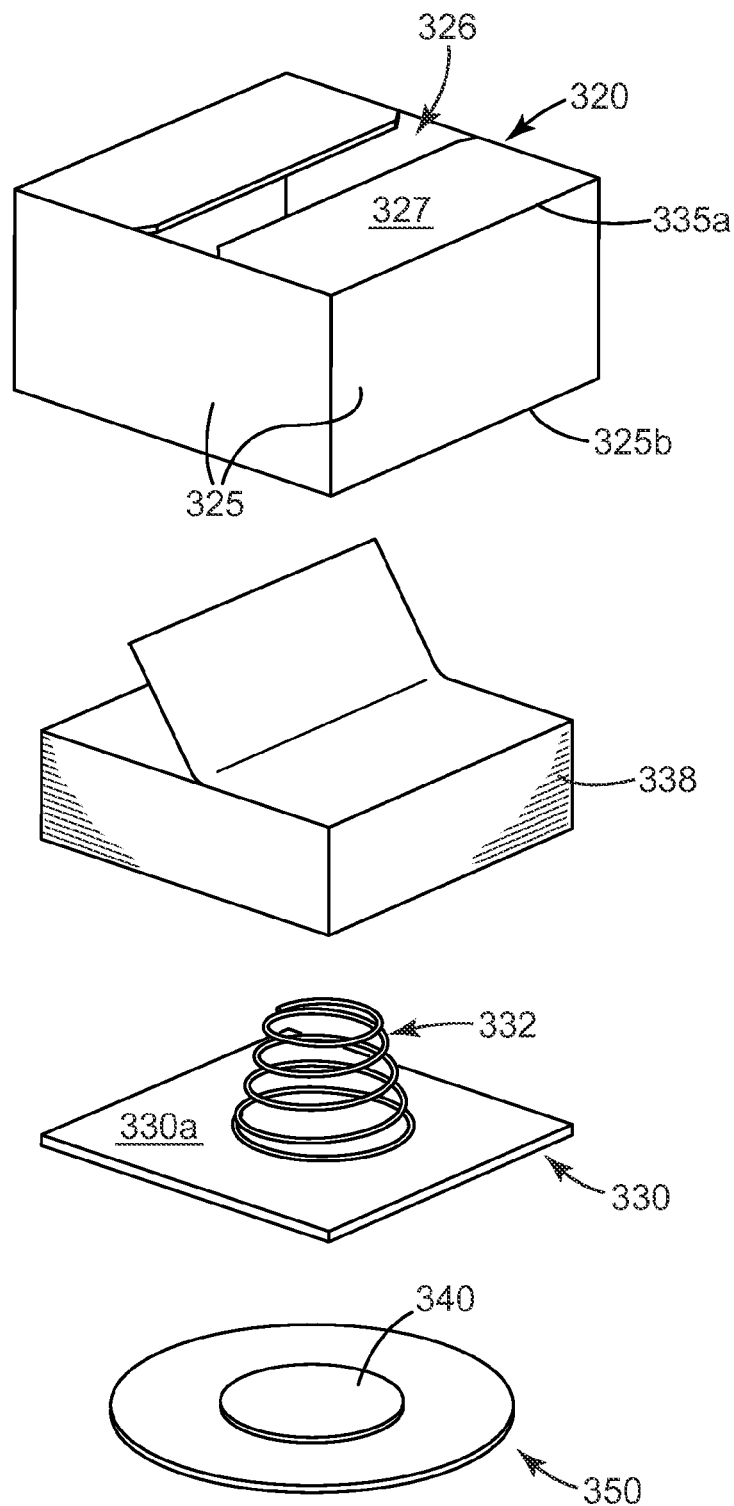
FIG. 6 is an exploded view of another exemplary dispenser.

FIG. 6 shows an exploded view of another dispenser of the present invention that is particularly suited for dispensing repositionable notes, such as Post-it® Notes commercially available from 3M Company. Such notes are paper based having a coating (typically a stripe) of repositionable adhesive across an edge of the note. The stripe of adhesive typically covers from 25% to 35% of the note's surface area. The dispenser includes an upper member 320 having a substantially box like shape with four side walls 325 disposed substantially orthogonal to one another and substantially orthogonal to a top 327. The sidewalls have top edge 325a and bottom edge 325b. A slot 326 is disposed on the top. The slot is sized to sufficiently wide to allow repositionable notes of desired width to be dispensed. The dispenser further includes substantially square lower member 330 having opposing interior surface 330a and exterior surface (not shown). In one embodiment, the upper and lower members are integrally formed. Spring 332, disposed on the interior surface of the lower member, acts as the biasing mechanism to push stack of repositionable notes 338 against the inside surface of top 327. Using attachment mechanism 340, circular holding film 350 attaches to the exterior surface of the lower member. This particular embodiment shows that the geometry of the holding film can, but does not necessarily have to be similar to that of the lower member.

Figure 7:
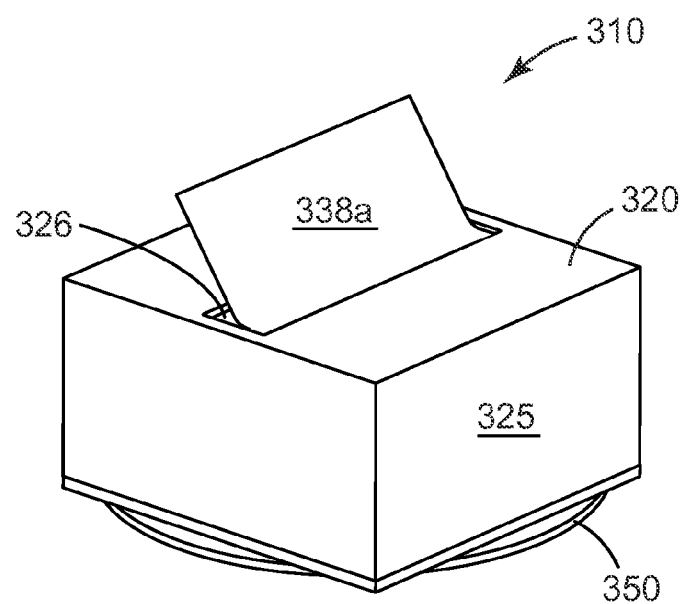
FIG. 7 is an isometric view of the dispenser of FIG. 6 in an assembled form.

FIG. 7 shows an isometric view of dispenser 310 of FIG. 6 assembled such that flag 338a extends through slot 326 and holding film 350 is attached to the lower member of the dispenser. In one embodiment, the dispenser is measures 3.125 by 3.125 inch (7.9 by 7.9 cm) in length and width and has height of 1½ inch (3.8 cm). A 3 inch (7.6 cm) diameter holding film and a 1 inch diameter (2.5 cm) circular double sided tape or cyanoacrylate adhesive is used to attach to the holding film and the lower member of the dispenser.

Figure 8:
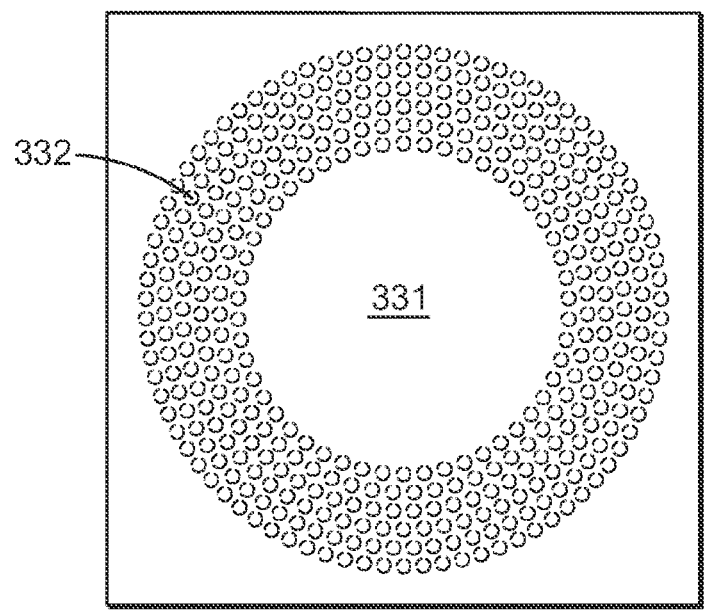
FIG. 8 is a bottom plan view an exemplary exterior surface of a lower member that can be used with the dispenser.

FIG. 8 shows a bottom plan view of the exterior surface of a lower member of yet another embodiment of the present invention. The exterior surface has a central planar area 331 for receiving the attachment mechanism. Surrounding the central planar area is roughened region 332, which can be created by a variety of methods such as embossing or perforating the lower member. In one embodiment, the roughened region includes a plurality of distinct raised dots. The roughened region can also result from applying a coating that would impart surface roughness to the exterior surface of the lower member. While this figure shows the roughened region as a circular pattern, other configurations and layouts can be used. For example, when using raised dots, they can be scattered throughout the exterior surface area of the lower member. In one aspect, the roughened region functions to reduce the contact surface area between the exterior surface of the lower member and the first surface of the holding film. Thus, the contact surface area between the second surface of the holding film to the work surface is larger than the contact surface area between the exterior surface of the lower member and the first surface of the holding film. This situation minimizes, if not reduces, the unexpected and undesirable situation where the act of removing a sheet from the dispenser causes the dispenser to dislodge inadvertently from the work surface.

Figure 9:
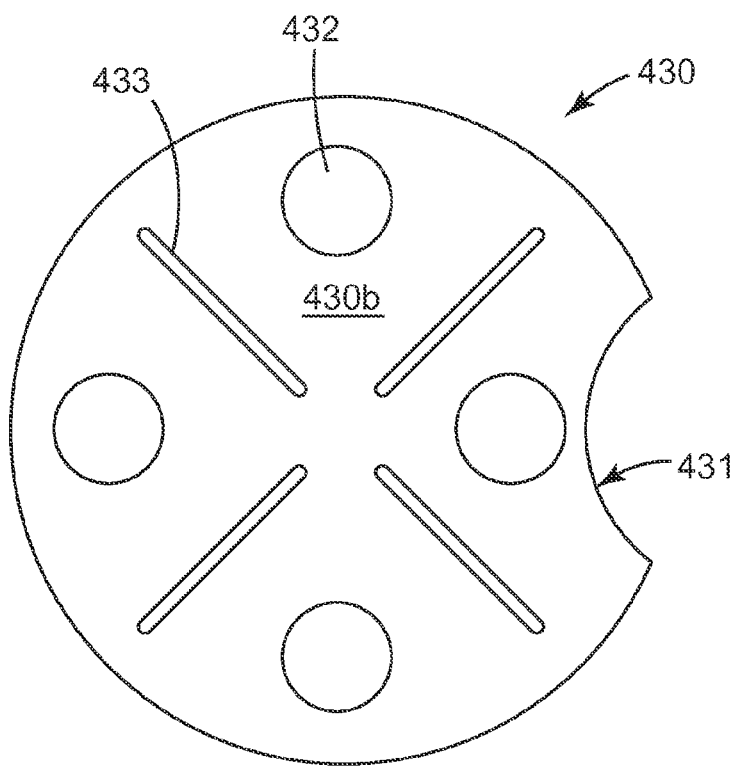
FIG. 9 is a bottom plan view of another exemplary exterior surface of a lower member that can be used with the dispenser.

FIG. 9 shows a bottom plan view of another exemplary exterior surface 430b of lower member 430 having cut-out 431 that can be used in the present invention. In this embodiment, the contact surface area between the exterior surface of the lower member and the first surface of the holding film has been reduced by use of holes 432. If desired, standoff bars 433 can also be used in addition to the holes.

Figure 10:
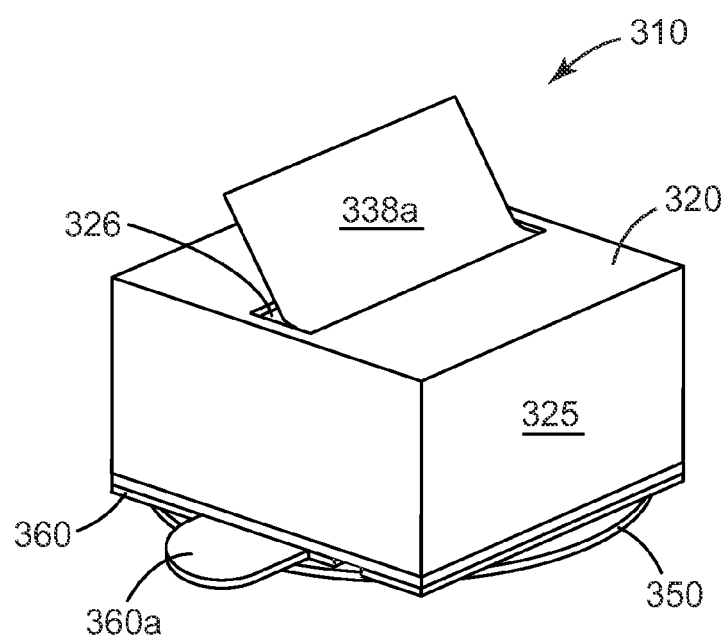
FIG. 10 is an isometric view of another exemplary dispenser with an activation card.

FIG. 10 shows an isometric view of another exemplary dispenser where the dispenser of FIG. 7 further includes an activation card 360 having a pull tab 360a. The pull tab can include pre-printed indicia (e.g., "Remove Before Using") instructing a consumer to remove the card before use. The activation card can be made from a variety of materials, including, e.g., paper and plastic film. The activation card lies between the holding film 350 and the exterior surface of the lower member, which in one embodiment, includes a roughened region like that shown in FIG. 8.

Figure 11:
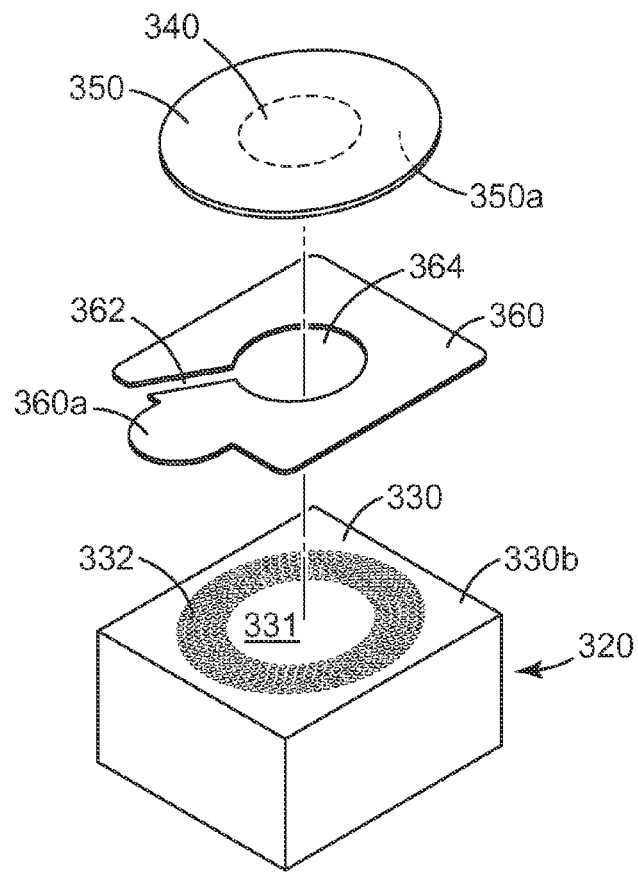
FIG. 11 is an exploded view of the bottom of the dispenser of FIG. 10.

FIG. 11 shows an exploded view of the bottom of the dispenser of FIG. 11 with holding film 350 having attachment mechanism 340 centrally located and shown in phantom. The activation card 360 disposed between first surface 350a of polymeric holding film 350 and outer surface 330b of lower member 330 includes an aperture 364 sized and placed so as to accommodate the attachment mechanism. The aperture is generally slightly larger than the dimension of the attachment mechanism. The activation card further includes an angled slit 362 allowing for its installation to the dispenser 320. While the design of the activation card is particularly suited for the dispenser of FIG. 7, other designs can be used. In one exemplary method of installing the activation card, one opens the slit 362 and slides the activation card between the holding film and the exterior surface of the lower member. In this particular embodiment, the perimeter of the activation card is substantially the same size as the perimeter of the lower member and covers a portion, if not substantially all, of the roughened region 332 on the exterior surface of the lower member.

In one embodiment, the activation card is made from paper or polymeric film, is of square geometry having a side length of 3 inch, a central hole having a diameter of 1.5 inch, a slit length of 1 inch and a slit gap distance of 0.25 inch. The design for the activation card shown in FIG. 11 can be made by die cutting the paper or polymeric film.

Figure 12:
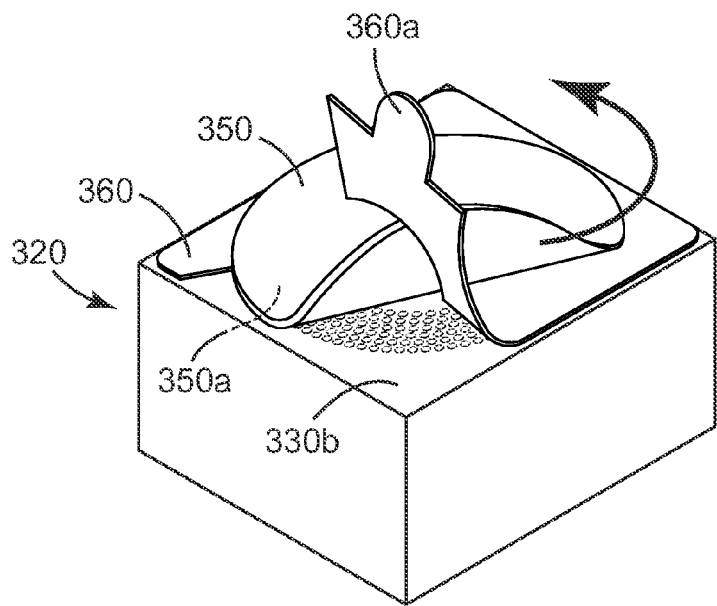
FIG. 12 is a schematic view showing removal of the activation card of the dispenser of FIG. 10 prior to use.

FIG. 12 schematically shows removing the activation card prior to using the dispenser. With the bottom of the dispenser generally facing a consumer, he or she lifts the pull tab (generally in the direction indicated by the arrow) away from the exterior surface of the dispenser and removes it completely. The lifting of the activation card causes the holding film to curl away from exterior surface of the lower member.

The activation card can be used in any dispenser or any item that incorporates the use of the attachment system.

EXAMPLES

The following polymeric films were tested for flexural modulus and surface roughness, according to the test method described above.

wide tape was attached to the top region of the dispenser, the tape functioning as a lead for the Instron jaw. The dispenser with the holding film was placed on a different work surfaces, such as panels of oak. The three types of work surfaces, all wood-based, tested included (a) cathedral cut oak veneer, (b) oak veneer with a polyurethane coating, and (c) an oak veneer with a lacquer coating. A cathedral cut oak veneer is one where the oak wood is sliced tangentially to the growth rings of the tree, thereby producing distinct peaks or spires in the grain pattern. The cathedral cut typically requires centering the wood grain to produce on the face of the veneer a substantially "V" figure resembling the spires of a cathedral. As between the three wood-based surfaces cited above, the cathedral cut veneer is the roughest.

The amount of force needed to pull the dispenser off the work surface is then measured. Of the five holding film types listed in Table 1 above, the EPDM rubber consistently gave the highest force on all three types of work surface. In terms of ranking the performance of the five films, the EDPM was the highest force values, followed by the urethane. As between the Santoprene, ECH, and PET, they all performed poorer than the urethane.

Although specific embodiments of the present invention have been shown and described, it is understood that these embodiments are merely illustrative of the many possible specific arrangements that can be devised in application of the principles of the invention. Numerous and varied other arrangements can be devised in accordance with these principles by those of ordinary skill in the art without departing from the spirit and scope of the invention. Thus, the scope of the present invention should not be limited to the structures described in this application, but only by the structures described by the language of the claims and the equivalents of those structures.

What is claimed is:

1. A dispenser configured for temporary attachment to a work surface, the dispenser comprising:
    an upper member having a slot and a lower member attached to the upper member thereby forming a housing, the lower member having an outer surface;
    a stack of sheets assembled in a fan-fold configuration disposed in the housing; and
    a polymeric holding film having a first surface and a second surface, the first surface attached to the outer surface of

TABLE 1

|  | Sample No. | | | | |
| --- | --- | --- | --- | --- | --- |
|  | 1 | 2 | 3 | 4 | 5 |
| Product Description | EPDM Rubber | Polyurethane | Santoprene | ECH (epichlorohydrin) | PET |
| Manufacturer | McMaster-Carr, Product No. 8610K81 | McMaster-Carr, Product No. 2178 T22 | McMaster-Carr, Product No. 86215 K11 | McMaster-Carr, Product No. 85765K31 | DuPont Teijin Films Melinex ® 561 |
| Thickness | 1/32 inch | 1/32 inch | 1/32 inch | 1/32 inch | 0.007 inch |
| Flexural Modulus (MPa) | 6.17 ± 0.07 | 54.9 ± 0.5 | 6.73 ± 0.4 | 6.80 ± 0.40 | 4,670 ± 454 |
| Roughness, $R_a$ (micrometer) | 0.429 ± 0.003 | 0.47 ± 0.04 | 1.7 ± 0.2 | 1.2 ± 0.3 | 0.0074 ± 0.0008 |

The holding films listed in Table 1 were then subjected to a test where tension force using an Instron machine using a cross head speed of 20 inch per minute. A three inch diameter circle of each type of film was taped using a one inch square double sided tape to a 3 inch circular shaped lower member of a dispenser similar to the one shown in FIG. 1. A one inch the lower member by an attachment mechanism selected from the group consisting of mechanical based attachment mechanisms and adhesive based attachment mechanisms, wherein the attachment mechanism is located centrally on the holding film and the area of the first surface is larger than the size of the attachment mechanism, the polymeric holding film having a flexural modulus less than about 50 MPa, as measured according to ASTM D790 standard, and a roughness parameter, $R_a$ of less than about 1 micrometer, as calculated according to ASME B46.1 standard, and the second surface of the polymeric holding film disposed so as to be placed in direct contact with a work surface.

2. The dispenser of claim 1, further comprising a removable activation card disposed between the first surface of the polymeric holding film and the outer surface of the lower member.

3. The dispenser of claim 1, wherein the polymeric holding film is attached to the outer surface of the lower member via adhesive means selected from a group consisting of stretch release adhesive strip, double-sided pressure sensitive adhesive tape, and cyanoacrylate adhesive.

4. The dispenser of claim 3, wherein the polymeric holding film has a first surface area and the adhesive means has a second surface area, and wherein the ratio of the first surface area to the second surface area is from about 10:1 to 3:1.

5. The dispenser of claim 1, wherein the polymeric holding film is polyurethane or a polymer derived from ethylene-propylene diene monomer.

6. The dispenser of claim 1, wherein the outer surface of the lower member includes a roughened region.

7. The dispenser of claim 2, wherein the activation card includes at least one aperture.

8. The dispenser of claim 1, wherein the upper and lower members are integrally formed.

9. The dispenser of claim 1 further comprising a biasing mechanism disposed inside the housing between the stack of sheets and the lower member.

10. The dispenser of claim 9 further comprising a plate disposed inside the housing between the biasing mechanism and the stack of sheets.

11. The dispenser of claim 1, wherein the polymeric holding film has a flexural modulus of less than about 10 MPa.

12. The dispenser of claim 1, wherein the polymeric holding film has a flexural modulus of about 5 to 7 MPa.

13. The dispenser of claim 1, wherein the upper member further comprises a pair of grooves disposed substantially parallel to one another and substantially transverse to the slot.

14. The dispenser of claim 1, wherein the upper member further comprises a protrusion disposed between a pair of side portions, the protrusion comprising a top region where the slot is disposed and sidewalls extending from the top region to the side portions.

15. The dispenser of claim 1, wherein the sheets are selected from the group consisting of paper and polymeric film.

16. The dispenser of claim 2, wherein the activation card is selected from the group consisting of paper and polymeric film.

17. The dispenser of claim 1 wherein the polymeric holding film has a first surface area and the ratio of the surface area of the holding film to the size of the attachment mechanism is from 10:1 to 3:1.

18. The dispenser of claim 1 wherein the polymeric holding film is attached to the lower member such that the polymeric holding film crowns slightly toward where it is attached to the lower member.

* * * * *